United States Patent [19]

Okura

[11] Patent Number: 4,776,664
[45] Date of Patent: Oct. 11, 1988

[54] OPTICAL TELEPHONE WIRE

[76] Inventor: Masahiko Okura, 12-7, 4-chome, Shiroganedai, Minato-ku, Tokyo, Japan

[21] Appl. No.: 87,303

[22] Filed: Aug. 20, 1987

[51] Int. Cl.⁴ .......................... G02B 6/44; H02G 7/05
[52] U.S. Cl. ............................... 350/96.23; 174/70 A; 174/117 R; D13/13
[58] Field of Search ................... 174/41, 70 R, 70 A, 174/115, 117 R, 117 F, 117 FF, 117 A; 350/96.23; D13/13

[56] References Cited

U.S. PATENT DOCUMENTS 4,467,138 8/1984 Brorein ........................ 174/115

FOREIGN PATENT DOCUMENTS 60-263908 12/1985 Japan ........................ 350/96.23
61-7816 1/1986 Japan ........................ 350/96.23
61-212810 9/1986 Japan ........................ 350/96.23

*Primary Examiner*—Laramie E. Askin
*Attorney, Agent, or Firm*—Moonray Kojima

[57] ABSTRACT

An optical telephone wire comprising an optical conductor having a first covering of rectangular cross-section and a messenger cable having a second covering of rectangular cross-section with one set of sides of the two sets of parallel sides of the second covering being longer than one set of sides of the two sets of parallel sides of the first covering and with the first and second coverings being integrally juxtaposed along their longitudinal axes so that one side of the other set of parallel sides of each of the coverings forms together a common surface and one side of the one set of two sets of parallel sides of each of the coverings are offset from each other in a step like manner.

1 Claim, 1 Drawing Sheet

U.S. Patent    Oct. 11, 1988    4,776,664
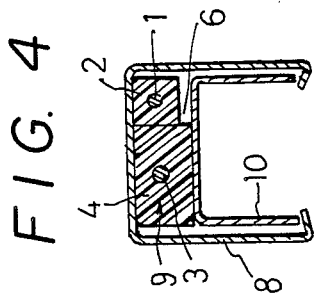
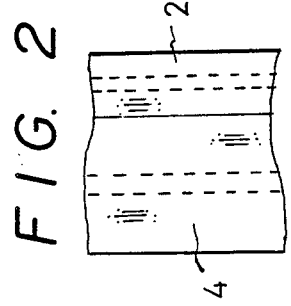
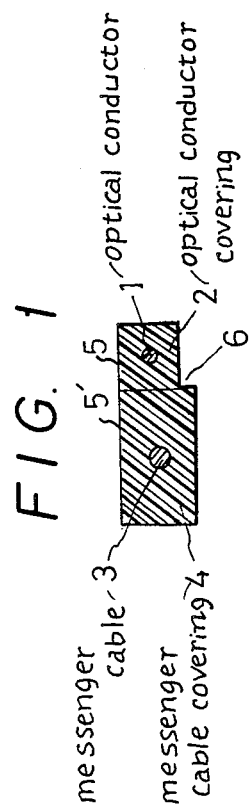
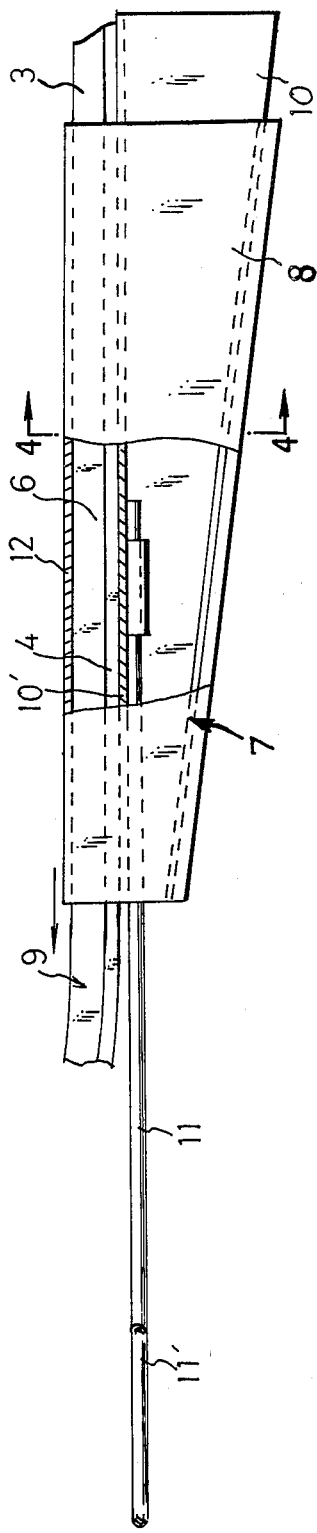

OPTICAL TELEPHONE WIRE

BACKGROUND OF THE INVENTION

This invention relates to an improvement of the optical telephone wires used primarily as drop wires in combination with known clamps.

As is well known, wiring of optical wires is desired to be made as straight as possible. Therefore, the well known wedge type clamps have been most recommended for such wires because they permit the wire to be clamped in a nearly straight condition. Such clamps, however, have a drawback in that the conventional messenger cables, which have a smooth-faced covering of circular contour in section, are liable to slip in the clamp in time, resulting in an unstable clamping.

SUMMARY OF THE INVENTION

The object of the invention is to provide an optical telephone wire, for use primarily as a drop wire, wherein the coverings of the optical conductor and the accompanying messenger cable have respectively a rectangular contour in section. The two coverings are integrally juxtaposed along the longitudinal axes thereof under a pre-established condition mentioned hereinafter namely, that the covering of the messenger cable have a larger side than that of the optical conductor covering with one side of each together forming a common surface and with the opposing sides of each being offset from each other in a step-like manner.

BRIEF DESCRIPTION OF THE DRAWING

FIG. 1 is a sectional front view of one form of the invention;

FIG. 2 is a fragmentary plan view of FIG. 1;

FIG. 3 is a fragmentary side elevational view of the wire of FIG. 1 with the known wedge type clamp;

FIG. 4 is a sectional view taken along the line 4—4 of FIG. 3.

DESCRIPTION OF THE PREFERRED EMBODIMENT

In FIG. 1, 1 is an optical conductor of the optical telephone wire having a covering 2 of rectangular contour in section. 3 is a messenger cable having a covering 4 of rectangular contour in section. The covering 2 is practically made of plural layers of different materials, but is shown as one layer similar to the covering 4 for the sake of simplicity. The coverings 2 and 4 are integrally juxtaposed along longitudinal axes thereof under a pre-established condition: namely, the coverings 2 and 4 are molded at the opposite sides thereof as shown in FIG. 1 in such relation that the upper sides 5, 5' of the coverings 2 and 4 are in alignment with each other, while the lower sides thereof have a step portion 6. The reason for this is that the certain clamping of the messenger cable 3 and the stable state of the conductor 1 in the clamp in time can virtually be assured under such conditions in this case.

While said coverings 2 and 4 should be made of the known suitable material to the optical wire, it will be desired in this case that the materials used for the coverings have a comparatively high resistance against compression and yet have a proper flexibility.

To clamp the optical wire by the known wedge type clamp, it can be effected in accordance with the manner shown in FIGS. 3 and 4 wherein the optical wire 9 is applied onto the sleeve-like member 8 of the clamp 7 in the first place and then the wire 9 may be sandwiched between members 8 and 10 as shown in the Figures. Thus, the wire can be clamped through the coverings 2 and 4 by moving the member 10 forwardly relative to the sleeve-like member 8 as shown by the arrow, i.e. in virtue of a wedge action. 11 is a suspending ring member provided with a suspending ring 11' at the fore end thereof, the rear end portion of which is attached fixedly to the upper plate 10' of the member 10. While an antiskid portion formed by partial cut-and-raise means is ordinarily present in the upper plate 12 of the member 8, it is omitted in the figures for the sake of simplicity.

According to the invention, since the coverings of the messenger cable and the optical conductor have respectively a rectangular contour in section, the contacting area of the coverings and the clamp becomes larger than the conventional ones having circular contour in section in the clamp in time, and yet the presence of the step portion 6 renders it possible to relieve the clamping pressure to the optical conductor 1 which results in the stable and certain clamping without exerting any bad influence upon the optical conductor. Further, the existence of the step portion serves to discriminate the optical conductor line from the messenger cable.

I claim:

1. An optical wire consisting of a single optical conductor (1), a single messenger cable (3), a first covering (2) for said optical conductor, and a second covering (4) for said messenger cable; wherein said first covering has a rectangular contour in section with a pair of parallel first sides of a first dimension and a pair of parallel second sides of a second dimension;

said second covering has a rectangular contour in section with a pair of parallel third sides of a third dimension and a pair of parallel fourth sides of a fourth dimension;

said first and second coverings being integrally juxtaposed along their longitudinal axes with a first side of the first covering being molded integrally to a third side of said second covering, with a second side of said first covering being in alignment with a fourth side of said second covering to form a common planar surface, and with the other second side of the first covering and the other fourth side of said second covering forming a step portion; and wherein said third dimension is longer than said first dimension.

* * * * *